United States Patent
Ernst et al.

(10) Patent No.: US 10,650,496 B2
(45) Date of Patent: May 12, 2020

(54) IMAGE SCALING WITH EFFICIENT PIXEL RESOLUTION CONVERSION

(71) Applicants: Larry M Ernst, Longmont, CO (US); Mikel John Stanich, Longmont, CO (US); John Thomas Varga, Longmont, CO (US)

(72) Inventors: Larry M Ernst, Longmont, CO (US); Mikel John Stanich, Longmont, CO (US); John Thomas Varga, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 313 days.

(21) Appl. No.: 15/895,451

(22) Filed: Feb. 13, 2018

(65) Prior Publication Data

US 2019/0251664 A1    Aug. 15, 2019

(51) Int. Cl.
  *G06K 9/20*  (2006.01)
  *G06T 3/40*  (2006.01)

(52) U.S. Cl.
  CPC .............. *G06T 3/4069* (2013.01); *G06T 3/40* (2013.01); *G06T 3/4007* (2013.01)

(58) Field of Classification Search
  USPC ...................................................... 382/300
  See application file for complete search history.

(56) References Cited

U.S. PATENT DOCUMENTS

| | | | |
|---|---|---|---|
| 6,931,163 B1 | 8/2005 | Wechgeln | |
| 7,130,876 B2 | 10/2006 | Chatterjee | |
| 7,193,753 B2 | 3/2007 | Case | |
| 7,710,604 B2 | 5/2010 | Condon et al. | |
| 8,086,073 B2 | 12/2011 | Jeffrey | |
| 8,331,732 B2 | 12/2012 | Metcalfe et al. | |
| 8,390,875 B2 | 3/2013 | Ogawara | |
| 8,538,199 B2 | 9/2013 | Ernst et al. | |
| 2008/0266580 A1 | 10/2008 | Choi et al. | |
| 2015/0163375 A1 | 6/2015 | Chandu et al. | |

FOREIGN PATENT DOCUMENTS

EP    0481808 A2    4/1992

OTHER PUBLICATIONS

"Arithmetic shifshift." Wikipedia. Retrieved from https://en.wikipedia.org/wiki/Arithmetic_shift on Dec. 19, 2017. pp. 1-4.

*Primary Examiner* — Stephen P Coleman
(74) *Attorney, Agent, or Firm* — Duft & Bornsen, PC (57) ABSTRACT

Systems and methods are provided for image scaling with efficient pixel resolution conversion. One embodiment is an image scaling system that includes a processor that receives an instruction to scale an input image having a first resolution by a scaling ratio to create an output image having a second resolution, and determines a rational fraction approximation of the scaling ratio to obtain a numerator integer representing a first block of consecutive pixels in the output image and a denominator integer representing a second block of consecutive pixels in the input image. The processor also calculates pixel values of the first block of pixels by: bit shifting pixel values of the second block of pixels, obtaining a sum of bit shifting operations of neighboring pixel values of the second block of pixels, and correcting the sum with a correction value to compensate for rounding errors in the bit shifting.

20 Claims, 7 Drawing Sheets

IMAGE SCALING WITH EFFICIENT PIXEL RESOLUTION CONVERSION

FIELD

This disclosure relates to scaling digital images.

BACKGROUND

Image scaling refers to expanding or reducing an input image to create an output image. Image scaling techniques that produce highly accurate output images generally sample/read pixels from fractional positions in the input image and/or incorporate weighted averages for areas in the input image. Although accurate, such techniques are computation-intensive and thus incur undesirable costs in time and expense for many real-world applications. For instance, in the field of printing where pixel values may be represented by eight bits (i.e., 256 different color values), resizing pixels to highly precise floating-point values may take significant processing resources which is not reflected in the quality of the printed output and delays the overall time to print. On the other hand, more basic techniques for scaling images that are based on linear interpolation (e.g., nearest neighbor scaling or Bresenham scaling) are less computation-expensive, but sometimes produce bands or stripes, referred to as artifacts, in the output image.

SUMMARY

Embodiments described herein provide for image scaling with efficient pixel resolution conversion. The image scaling technique described herein avoids the overhead associated with performing floating point arithmetic. Instead, floating point arithmetic is approximated using bit shifting (i.e., arithmetic shifting). Using bit shifting in this manner may introduce rounding errors in the result. Therefore, the scaling includes a correction technique that appropriately adjusts the result such that an accurate approximation of pure area scaling is performed without the processing cost of performing floating point calculations.

One embodiment is an image scaling system that includes a processor configured to receive an instruction to scale an input image having a first resolution by a scaling ratio to create an output image having a second resolution. The processor is further configured to determine a rational fraction approximation of the scaling ratio to obtain a numerator integer representing a first block of consecutive pixels in the output image and a denominator integer representing a second block of consecutive pixels in the input image. The processor is also configured to calculate pixel values of the first block of pixels by: bit shifting pixel values of the second block of pixels, obtaining a sum of bit shifting operations of neighboring pixel values of the second block of pixels, and correcting the sum with a correction value to compensate for rounding errors in the bit shifting.

In another embodiment, the correction value for a scaling ratio less than one is based on a count of a number of bits set to one in the second block of pixels. In yet another embodiment, if the scaling ratio is greater than one, the processor is configured to convert multiple pixels representing color values in the input image into an increased number of output pixels in the output image by: obtaining a first result by bit shifting a first value of a first pixel of the multiple pixels in the input image, obtaining a second result by bit shifting a second value of a second pixel of the multiple pixels in the input image, adding the first result and the second result to obtain a value of a output pixel, and correcting the value of the output pixel by adding a lower bit of one of the first pixel and the second pixel to the value of the output pixel.

In another embodiment, if the scaling ratio is less than one, the processor is configured to convert multiple pixels representing color values in the input image into fewer output pixels by: performing a combination of bit shifting operations and summation operations on the multiple pixels in the input image to obtain values for the fewer output pixels, identifying one or more output pixels among the fewer output pixels for which bit shifting of two positions was performed, correcting a value for each of the one or more output pixels by adding a count of a number of bits set to one among two least significant bits in a color value among the multiple pixels used in converting to the one or more output pixels, identifying at least one output pixel among the fewer output pixels for which bit shifting of one position was performed, and correcting a value for each of the at least one output pixel by adding a lower bit of one of a pair of pixels used to create the at least one output pixel. In a further embodiment, the processor is configured to create the output image by iteratively calculating pixel values in first blocks of the output image by bit shifting and adding pixel values in second blocks of the input image.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
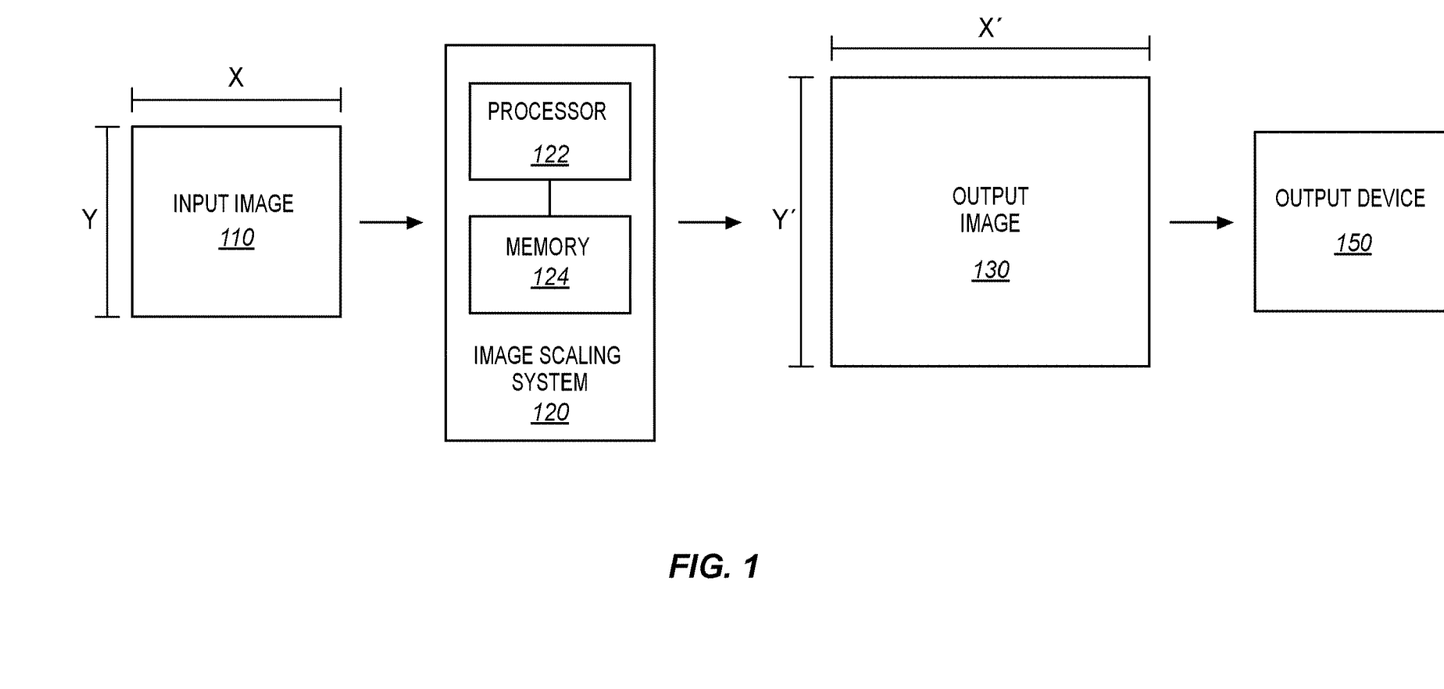
FIG. 1 illustrates an image scaling system in an illustrative embodiment.

FIG. 1 illustrates an image scaling system 120 in an illustrative embodiment. The image scaling system 120 may be any system, device, circuitry and/or other suitable component that is operable to scale an input image 110 of X*Y resolution into an output image 130 of X'*Y' resolution. The image scaling system 120 may scale the resolution of the input image 110 up or down and by any number of scaling factors, and although the spatial size of the output image 130 is shown to be different for purposes of illustration, it will be appreciated that the spatial size of the input image 110 and the output image 130 may be the same. As described in greater detail below, the image scaling system 120 is enhanced to efficiently convert resolutions while avoiding floating point operations and integer multiplies and divides. After converting the input image 110 into the output image 130, the image scaling system 120 transfers the scaled output image 130 to an output device 150 for presentation of the output image 130. Examples of the output device 150 include printers, display screens, digital cameras, etc.

In one embodiment, the image scaling system 120 is implemented by a processor 122 communicatively coupled to a memory 124. The processor 122 includes any electronic circuits and/or optical circuits that are able to perform functions. For example, the processor 122 may include one or more Central Processing Units (CPU), Graphics Processing Units (GPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc. The memory 124 includes any electronic circuits, optical circuits, and/or magnetic circuits that are able to store data. For instance, the memory 124 may include one or more volatile or non-volatile Dynamic Random Access Memory (DRAM) devices, FLASH devices, volatile or non-volatile Static RAM (SRAM) devices, magnetic disk drives, Solid State Disks (SSDs), etc. Some examples of non-volatile DRAM and SRAM include battery-backed DRAM and battery-backed SRAM. The image scaling system 120 may be configured as part of the output device 150 or external thereto.

Figure 2:
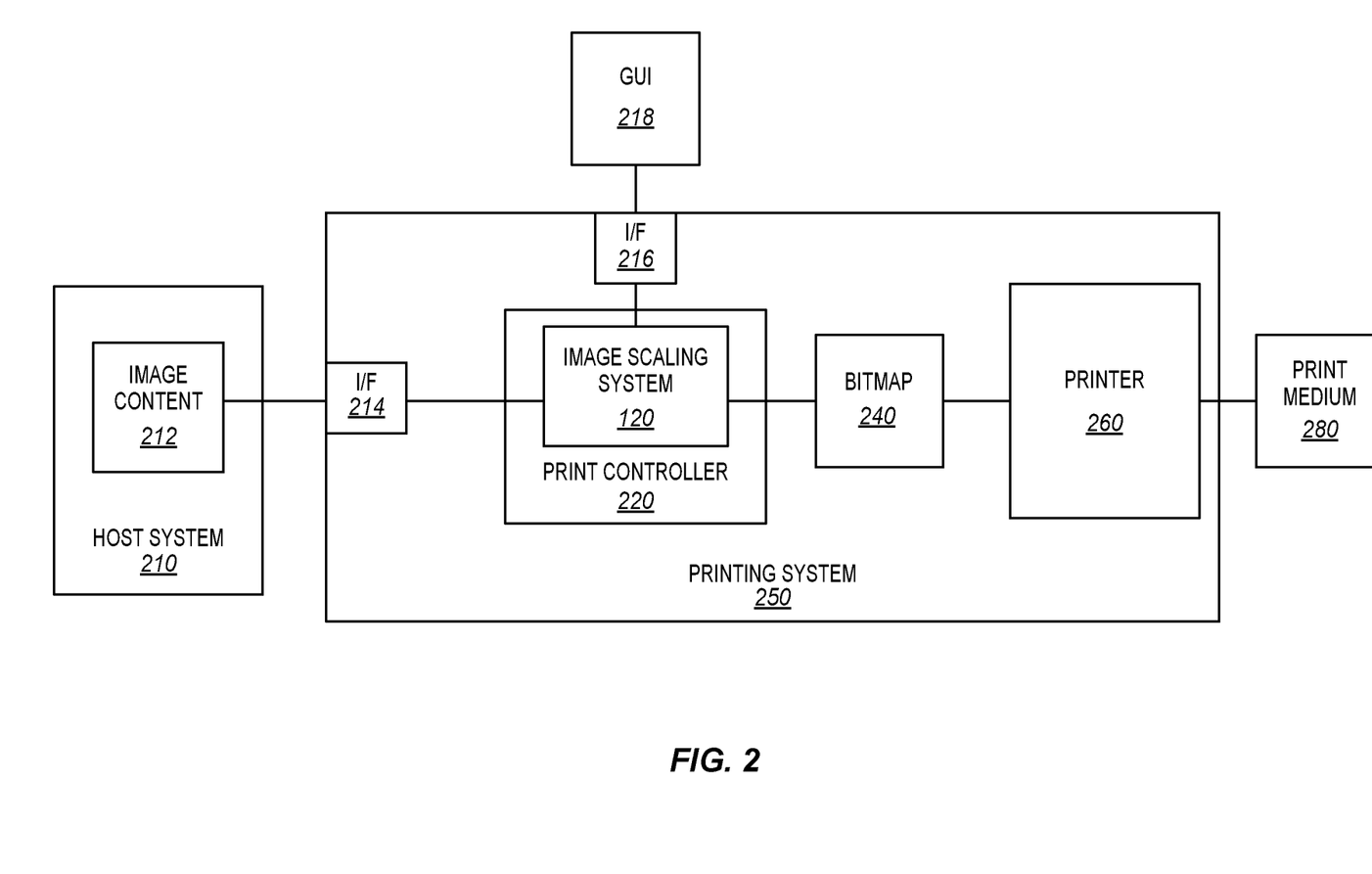
FIG. 2 is a block diagram illustrating a printing system using an image scaling system in an illustrative embodiment.

FIG. 2 is a block diagram illustrating a printing system 250 using the image scaling system 120 in an illustrative embodiment. A host system 210 is in communication with the printing system 250 to print image content 212 onto a print medium 280 via a printer 260. The resulting print medium 280 may be printed in color and/or in any of a number of gray shades. The host system 210 may comprise any computing device, such as a personal computer or a server. The image content 212 may be any file or data (e.g., print job data) that describes how an image on a sheet of print medium is to be printed. For example, the image content 212 may include PostScript data, Printer Command Language ("PCL") data, the Intelligent Printer Data Stream ("IPDS") data, and/or any other printer language data. Alternatively or additionally, the printing system 250 may compose the image content 212 using a Printer Definition Language (e.g., Portable Document Format (PDF) or IPDS) and Job Tickets (for non-IPDS). As such, the printing system 250 may create a first bitmap and scale it to a second bitmap.

The print controller 220 may be any system, device, circuitry, and/or other suitable component operable to control the printer 260 based on print data received from the host system 210. In doing so, the print controller 220 may transform the image content 212 into a bitmap 240 and transmit the bitmap 240 to the printer 260 which uses it to imprint onto the print medium 280 (e.g., via toner, ink, etc.). The image scaling system 120 may be configured as part of the print controller 220 and/or any other portion of the printing system 250. In some embodiments, the image scaling system 120 may be configured with the host system 210.

The image scaling system 120 may scale the image content 212 to generate the bitmap 240 according to scaling techniques described in greater detail below. The image scaling system 120 and/or the print controller 220 may be communicatively coupled with the host system 210 via an interface 214, and may also be communicatively coupled to a Graphical User Interface (GUI) 218 via interface 216. The interface(s) 214/216 may be any system, device, or component to receive image data, print data, and/or user input (via keyboard, mouse, display screen, etc., input via GUI 218). The print medium 280 may be continuous form paper, cut sheet paper, and/or any other medium suitable for printing. The printing system 250 may be a high-speed printer operable to print relatively high volumes (e.g., greater than 100 pages per minute). Illustrative details of the operation of the image scaling system 120 will be discussed with regard to FIG. 3.

Figure 3:
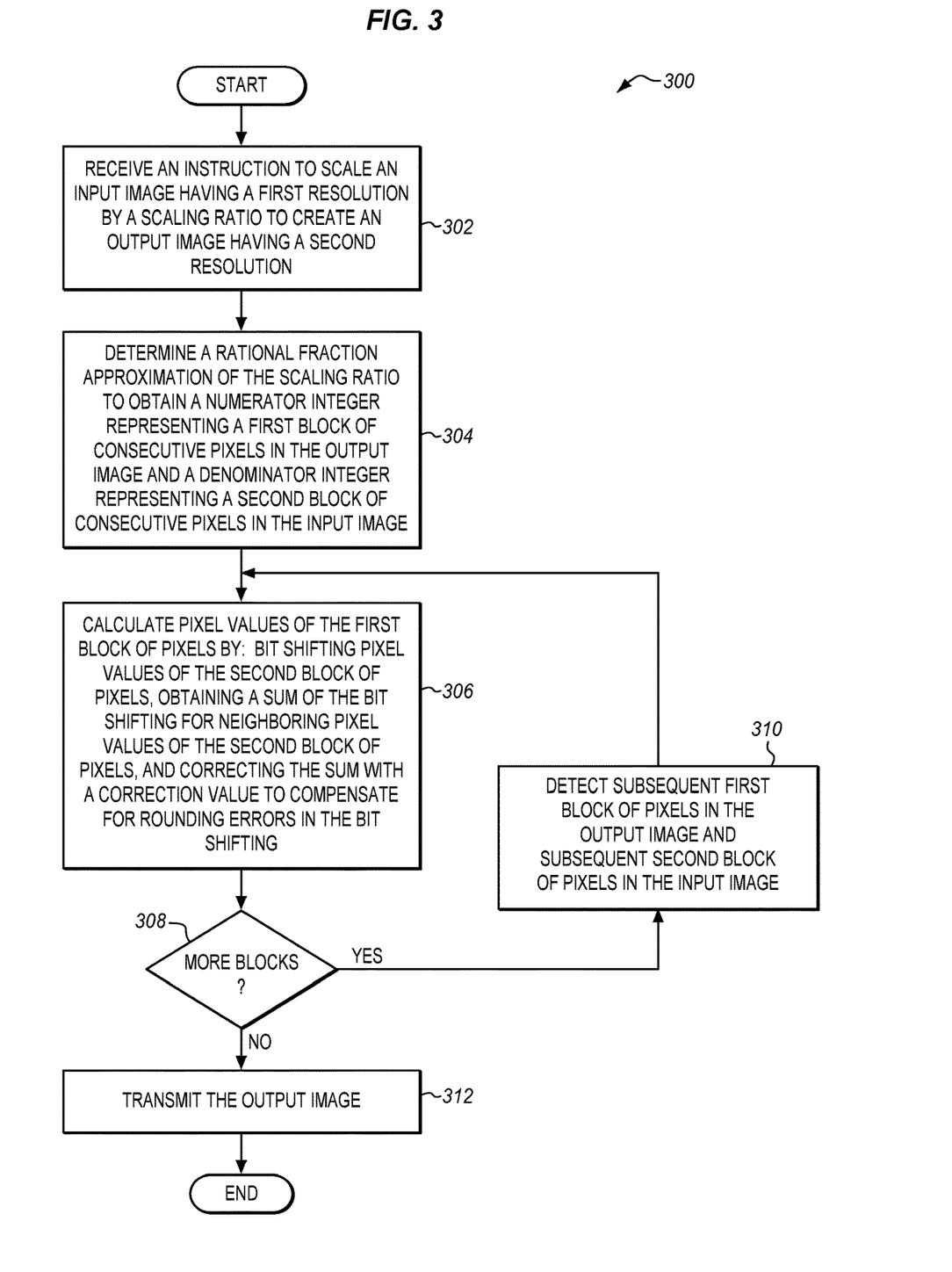
FIG. 3 is a flowchart illustrating a method for converting an image from one resolution to another resolution in an illustrative embodiment.

FIG. 3 is a flowchart illustrating a method 300 for converting an image from one resolution to another resolution in an illustrative embodiment. The steps of the flowcharts are described with reference to the image scaling system 120 of FIGS. 1 and 2, but those skilled in the art will appreciate the methods may be performed in other systems. The steps described herein are not all inclusive, may include other steps not shown, and may be performed in alternative orders.

In step 302, the interface 214 receives an instruction to scale an input image 110 having a first resolution by a scaling ratio to create an output image 130 having a second resolution. The scaling ratio and/or the desired output resolution may be input by a user via the GUI 218 or received as instruction data via the interface 214. The scaling ratio may be defined as a ratio having an output resolution as a numerator and an input resolution in the denominator.

In step 304, the image scaling system 120 determines a rational fraction approximation of the scaling ratio to obtain a numerator integer representing a first block of consecutive pixels in the output image and a denominator integer representing a second block of consecutive pixels in the input image. A rational fraction approximation computes two integer values having a ratio that is the same as the scaling ratio that are the smallest integers that exist. In one embodiment, a rational fraction approximation expresses the numerator and denominator by prime number factors that are reduced. For example, in converting 600 Dots Per Inch (DPI) to 450 DPI, the numerator 450 is expressed as $2*3^2*5^2$, and the denominator 600 is expressed as $2^3*3*5^2$. The reduced result from these factors is in $3/2^2$, or 3/4. Therefore, the rational fraction approximation in this example is 3/4, and as described in greater detail below, the image scaling system 120 may convert each 4 pixel block in the input image into a 3 pixel block in the output image. The image scaling system 120 may therefore use a block replacement process where each block is tiled across the input image 110 and the output image 130 and where the tiling offset is the same size as the replacement blocks. The image scaling system 120 may account for missing data in blocks due to differences between the tiled image size and the actual image size by padding the input data and the output data. After padding operations are performed, the image scaling system 120 may truncate the output image 130 to the precise scaled image size. In another example, in converting from 600 DPI to 900 DPI, the numerator 900 is expressed as $2^2*3^2*5^2$, the denominator is expressed as $2^3*3*5^2$, and the rational fraction approximation is 3/2. Therefore, in this example, the image scaling system 120 may convert a 2 pixel block in the input image into a 3 pixel block in the output image. As such, the image scaling system 120 may use the rational fraction approximation of the scaling ratio to determine how blocks pixels in the input image map to blocks of pixels in the output image for conversion.

In step 306, the image scaling system 120 calculates pixel values of the first block of pixels by: bit shifting pixel values of the second block of pixels, obtaining a sum of the bit shifting for neighboring pixel values of the second block of pixels, and correcting the sum with a correction value to compensate for rounding errors in the bit shifting. In step 308, the image scaling system 120 determines whether there are more blocks of pixels to be converted from the input image to the output image. If so, the method 300 proceeds to step 310 and the image scaling system 120 detects a subsequent first block of pixels in the output image and detects a subsequent second block of pixels in the input image. The offset used for each block of the input image 110 may be equal to the input block size and the offset used for each block of the output image 130 may be equal to the output block size. Steps 306-310 may be repeated for the entire image until all pixels of the input image have been converted into pixels in the output image. In step 312, the image scaling system 120 may transmit the output image to the output device 150 (e.g., to the printer 260 for printing on the print medium 280).

In the method 300, the image scaling system 120 uses a rational fraction approximation of the scaling ratio to determine the block replacement process that is used to scale the image. That is, the rational fraction approximation describes the scaling that occurs on a block-by-block basis. Since the pixel values in the input image are known, the image scaling system 120 is able to take a number of pixels that belong to a second block in the input image, perform a combination of bit shifting and simple integer addition operations, and determine the pixel values for a different number of pixels that belong to a first block in the output image. The image scaling system 120 therefore approximates the scaling accurately without performing computation-intensive operations. Bit shifting of the type described herein may apply to scaling where the denominator value for the scaling ration can be expressed as a power of two and the numerator value can be expressed as an integer. This is the case for the examples discussed herein in which the scaling ratio denominator value is 2 to an integer power N, where N=2 for 3 to 4 scaling and N=1 for 3 to 2 scaling. The integer numerator and power of two denominator enables the scaling coefficients to be quantized.

Figure 4:
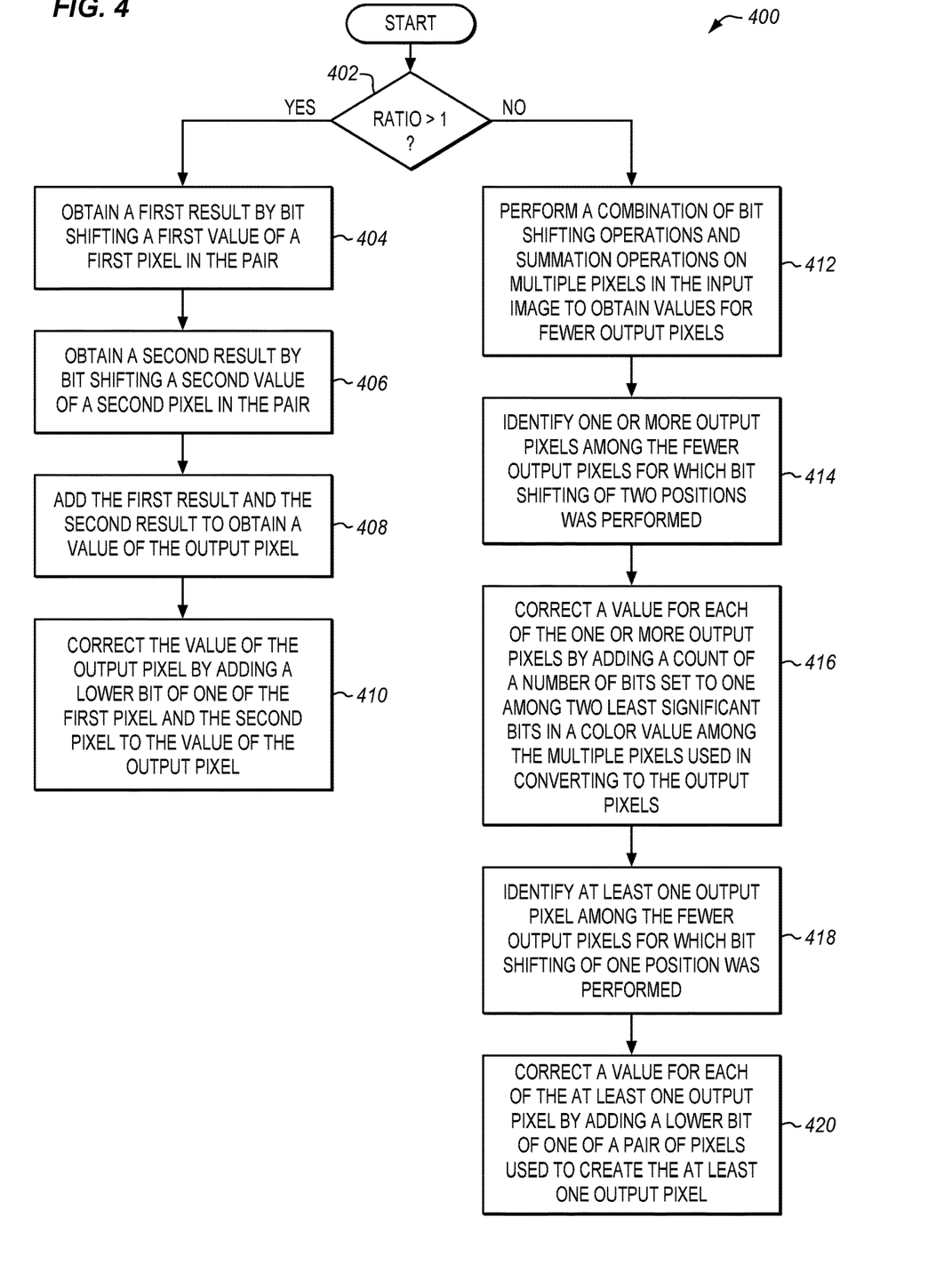
FIG. 4 is a flowchart illustrating a method for converting an image with particular approximation operations in an illustrative embodiment.

FIG. 4 is a flowchart illustrating a method 400 for converting an image with particular approximation operations in an illustrative embodiment. The steps of the method 400 may further define the operations that are performed in step 306 of the method 300. In step 402, the image scaling system 120 determines whether the scaling ratio is greater than one. If so, the method 400 proceeds to steps 404-410 for calculating output pixels. Otherwise, the method 400 proceeds to steps 412-420 for calculating output pixels. While the greater than one decision path from step 402 provides an illustrative example having a pair of pixels in the block, it should be appreciated that in a more general case a larger number of pixels may be converted using a combination of shifting and summing operations like the operations described in the NO path of step 402.

Figure 5:
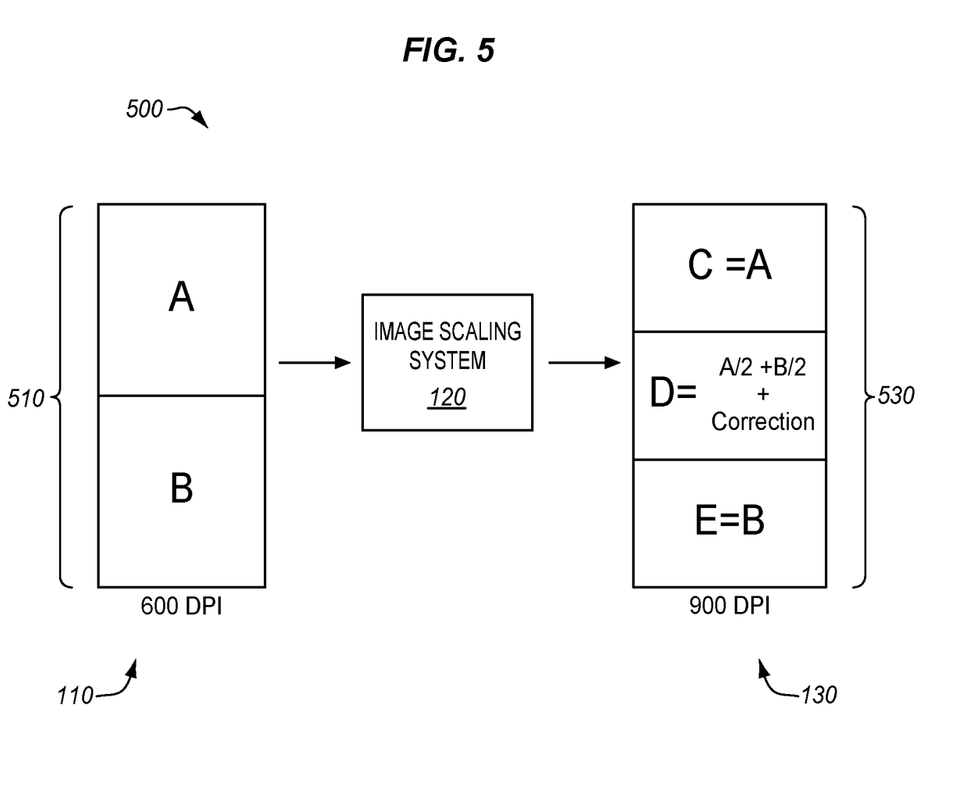
FIG. 5 is a diagram illustrating image conversion with a scaling ratio greater than one in an illustrative embodiment.

FIG. 5 is a diagram 500 illustrating image conversion with a scaling ratio greater than one in an illustrative embodiment. In this example, the image scaling system 120 is instructed to convert the input image 110 having 600 DPI to an output image 130 having 900 DPI. After determining the rational fraction approximation to be 3/2, the image scaling system 120 converts the second block 510 of the input image 110 into the first block 530 of the output image 130, thus converting every two linear pixels (i.e., pixels A and B) in the input image 110 into three pixels (i.e., pixels C, D, and E) along the same direction in the output image 130. In one dimension scaling, the resulting pixels in the output image 130 may represent the same spatial distance along the same direction as the input image 110 but with different pixel boundaries. As such, the image scaling system 120 may assign pixel values at either end of the first block 530 (e.g., pixels C and E) to the same respective values in the input image 110 (e.g., values of pixels A and B, respectively). Since the middle pixel of the first block 530 (e.g., pixel D) is a blend of pixels A and B and a correction value, the image scaling system 120 may determine the value of the middle pixel according to the steps 404-410.

Returning again to FIG. 4, in step 404, the image scaling system 120 obtains a first result by shifting a first value of a first pixel in the pair (e.g., bit shifting the value of pixel A). In step 406, the image scaling system 120 obtains a second result by bit shifting a second value of a second pixel in the pair (e.g., bit shifting the value of pixel B). In step 408, the image scaling system 120 adds the first result and the second result to obtain a value of the output pixel (e.g., the middle pixel D). In step 410, the image scaling system 120 corrects the value of the output pixel by adding a lower bit of one of the first pixel and the second pixel to the value of the output pixel. Steps 404-410 may be repeated for subsequent blocks in the image.

Suppose, for example, that the value of both pixels A and B of the second block 510 of the input image 110 is 3 (i.e., 0011 in binary). The "/2" shown in FIG. 5 is a division by two. In binary arithmetic, division by two can be performed by a bit shift operation that shifts the number one place to the right. The empty position in the most significant bit is filled with a copy of the original most significant bit. The image scaling system 120 may therefore approximate floating point calculated values by performing some combination of bit shifting and integer addition operations. In particular, the image scaling system 120 may approximate 50% of an input binary value by bit shifting the input binary value to the right one bit.

Thus, in performing steps 404-406 in this example, the image scaling system 120 obtains first and second results of 1 (i.e., shifting 0011 to obtain 0001). In step 408, the image scaling system 120 adds the results (1+1) to get a value of 2 for pixel D. Here, if floating point calculations were performed, pixel D would be calculated by mixing 50% of pixel A (e.g., 1.5) with 50% of pixel B (e.g., 1.5) to obtain an accurate resulting value of 3. The approximating bit shifting steps of 404-408 may not obtain the exact result because right shifts result in a rounding down that may impact the accuracy of the output pixel. Therefore, to obtain the accurate result without performing floating point calculations, the image scaling system 120 corrects the added results of step 408. In particular, in step 410, the image scaling system 120 corrects the value of the output pixel (e.g., 2) by adding a lower bit of one of the first pixel and the second pixel (e.g., 1) to the value of the output pixel (e.g., 2). That is, the image scaling system 120 adds the lower bit of either pixel A or B (e.g., 1) to the result of steps 404-408 (e.g., 2), to correct the value and obtain the accurate result (e.g., 3) for the middle pixel value D.

Figure 6:
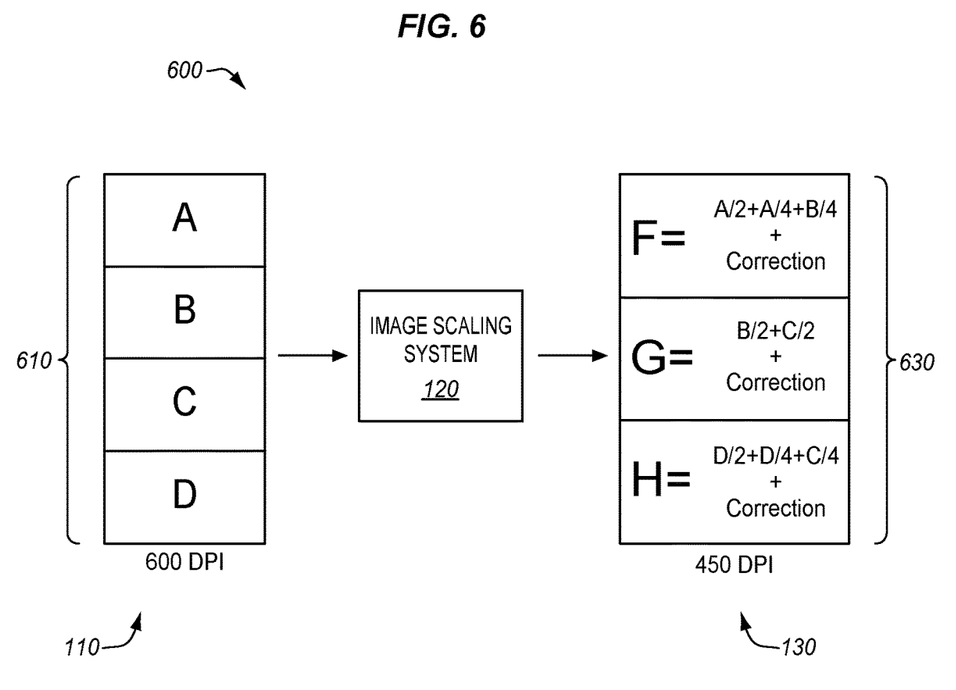
FIG. 6 is a diagram illustrating image conversion with a scaling ratio less than one in an illustrative embodiment.

FIG. 6 is a diagram 600 illustrating image conversion with a scaling ratio less than one in an illustrative embodiment. In this example, the image scaling system 120 is instructed to convert the input image 110 having 600 DPI to an output image 130 having 450 DPI. After determining the rational fraction approximation to be 3/4, the image scaling system 120 converts the second block 610 of the input image 110 into the first block 630 of the output image 130, thus converting every four linear pixels (i.e., pixels A, B, C, and D) in the input image 110 into three pixels (i.e., pixels F, G, and H) along the same direction in the output image 130. The image scaling system 120 may determine the values of pixels F, G, and H according to the steps 412-420.

Returning again to FIG. 4, in step 412, the image scaling system 120 performs a combination of bit shifting operations and summation operations on multiple input pixels in the input image 110 to obtain values for fewer output pixels in the output image 130. In step 414, the image scaling system 120 identifies one or more output pixels among the fewer output pixels for which bit shifting was performed. In step 416, the image scaling system 120 corrects a value for each of the one or more output pixels by adding a count of a number of bits set to one among the two least significant bits in a color value among the multiple pixels used in converting to the output pixels. In step 418, the image scaling system 120 identifies at least one output pixel among the fewer output pixels for which bit shifting of one position was performed. In step 420, the image scaling system 120 corrects a value for each of the at least one output pixel by adding a lower bit of one of a pair of pixels used to create the at least one output pixel. Steps 412-420 may be repeated for subsequent blocks in the image.

If floating point calculations were performed, pixel F would be calculated by taking 75% of pixel A and 25% of pixel B, pixel G would be calculated by taking 50% of pixel B and 50% of pixel C, and pixel H would be calculated by taking 25% of pixel C and 75% of pixel D. To avoid these floating point calculations and the associated overhead costs, the image scaling system 120 instead performs steps 412-420 to approximate and then correct the result.

In performing step 412, the image scaling system 120 may approximate the value for pixel F by bit shifting the value of pixel A one position, bit shifting the value of pixel A two positions, bit shifting the value of pixel B two positions, adding the results together, and then correcting the result. The "/2" in FIG. 6 represents a division by two and is performed by a right bit shifting operation of one position (e.g., approximating 50%), and the "/4" represents a division by four and is performed by a right bit shifting operation of two positions (e.g., approximating 25%). As such, the image scaling system 120 may approximate the value for pixel F by adding A/2, A/4, and B/4 and then applying a correction to the result to compensate for the rounding down effect of the bit shifting. Similarly, the image scaling system 120 may approximate the value for pixel H by adding D/2, D/4, C/4, and a correction. With respect to the middle pixel G, the image scaling system 120 may approximate the value by adding B/2, C/2, and a correction. Therefore, in step 412, the image scaling system 120 may, in embodiments for which the scaling ratio is less than one, perform a combination of bit shifting operations and summation operations on multiple pixels in the input image 110 to obtain values for fewer output pixels in the output image 130.

In performing step 414, the image scaling system 120 may identify pixels F and H in the first block 630 of the output image 130 as being pixels for which bit shifting of two positions was performed. Then, in performing step 416, the image scaling system 120 may correct pixels F and H by adding a count of a number of bits set to one among two least significant bits in a color value used in the conversion that is dominant. Thus, the image scaling system 120 may count the number of on bits (e.g., bits that have a value of 1) in pixel A (e.g., the dominant term that is 75% of F) and apply the count as a correction for determining the value of pixel F. Similarly, the image scaling system 120 may count the number of on bits in pixel D (e.g., the dominant term of H) and apply the count as a correction for determining the value of pixel H.

Suppose, for example, that the value for each of the pixels A, B, C, and D in the second block 610 of the input image 110 is 7 (i.e., 0111 in binary). The image scaling system 120, before correction, may calculate pixel F as A/2 (i.e., 0011, or 3), added with A/4 (i.e., 0001, or 1), and added with B/4 (i.e., 0001, or 1) to obtain a result of 5. Then, the image scaling system 120 may apply a correction result by adding a count of the two least significant bits in the dominant term of the conversion that is on. In this case, there are two bits that are on in the two least significant bits of the binary term 0111 (e.g., the value of pixel A that is the dominant term used in the conversion of pixel F). Therefore, the image scaling system 120 adds 2 to the result of 5 to obtain a corrected result of 7, and an accurate result is determined for pixel F without any floating point calculations or integer multiplication or division. To illustrate by another example, if the value of pixel A were 6 (i.e., 0110), the count would be one because there is one on bit in the bottom two bits. Similar steps may be performed to determine pixel H. As such, the correction of step 416 may apply to conversion of pixels in the first block 630 for which a bit shifting of two positions is performed (e.g., pixels F and H).

In performing step 418, the image scaling system 120 may identify pixel G in the first block 630 of the output image 130 as being a pixel for which bit shifting as just one position was performed, or alternatively, for which bit shifting of two positions was not performed. Then, in performing step 420, the image scaling system 120 may correct pixel G by adding a lower bit of one of a pair of pixels used to create pixel G (e.g., the lower bit of either pixel B or C). In continuing with the example above in which pixel B and C have a value of 7, or 0111, the image scaling system 120 in this case applies a correction of one. Therefore, the image scaling system 120 determines the value of pixel G as B/2 (i.e., 0011, or 3), added with C/2 (i.e., 0011, or 3), added with 1, to obtain an accurate result of 7 without performing any floating point calculations. In some cases, the steps of the methods 300 and 400 described above may yield pixel value results that do not exactly match a floating point equivalent. Nonetheless, the bit shifting and correction techniques described above enable the image scaling system 120 to efficiently scale images with accurate approximation. In some embodiments, the image scaling system 120 may use a lookup table that is unique to a particular scaling ratio to convert two or more combined values to yield the output pixel result (e.g., without applying a counting correction). It will be appreciated that the techniques described herein with respect to one dimensional scaling may apply to two dimensional images by executing one dimensional scaling techniques two times or once for each direction.

Figure 7:
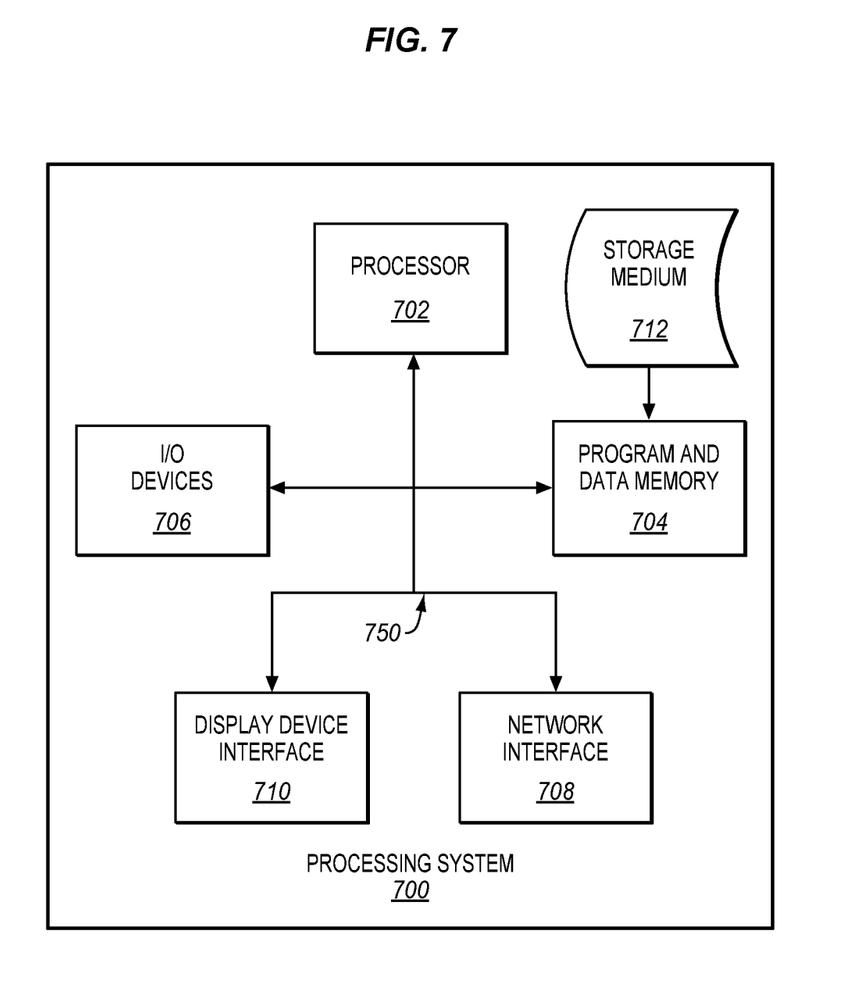
FIG. 7 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of the image scaling system 120 to perform the various operations disclosed herein. FIG. 7 illustrates a processing system 700 operable to execute a computer readable medium embodying programmed instructions to perform desired functions in an illustrative embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

Although specific embodiments are described herein, the scope of the disclosure is not limited to those specific embodiments. The scope of the disclosure is defined by the following claims and any equivalents thereof.

What is claimed is:

1. An image scaling system comprising:
a processor configured to receive an instruction to scale an input image having a first resolution by a scaling ratio to create an output image having a second resolution; and
the processor configured to determine a rational fraction approximation of the scaling ratio to obtain a numerator integer representing a first block of consecutive pixels in the output image and a denominator integer representing a second block of consecutive pixels in the input image, and to calculate pixel values of the first block of pixels by: bit shifting pixel values of the second block of pixels, obtaining a sum of bit shifting operations of neighboring pixel values of the second block of pixels, and correcting the sum with a correction value to compensate for rounding errors in the bit shifting,
the processor configured to transmit the output image.

2. The image scaling system of claim 1 wherein:
the correction value for a scaling ratio less than one is based on a count of a number of bits set to one in the second block of pixels.

3. The image scaling system of claim 1 wherein:
if the scaling ratio is greater than one, the processor is configured to convert multiple pixels representing color values in the input image into an increased number of output pixels in the output image by:
obtaining a first result by bit shifting a first value of a first pixel of the multiple pixels in the input image;
obtaining a second result by bit shifting a second value of a second pixel of the multiple pixels in the input image;
adding the first result and the second result to obtain a value of a output pixel; and
correcting the value of the output pixel by adding a lower bit of one of the first pixel and the second pixel to the value of the output pixel.

4. The image scaling system of claim 1 wherein:
if the scaling ratio is less than one, the processor is configured to convert multiple pixels representing color values in the input image into fewer output pixels by:
performing a combination of bit shifting operations and summation operations on the multiple pixels in the input image to obtain values for the fewer output pixels;
identifying one or more output pixels among the fewer output pixels for which bit shifting of two positions was performed;
correcting a value for each of the one or more output pixels by adding a count of a number of bits set to one among two least significant bits in a color value among the multiple pixels used in converting to the one or more output pixels;
identifying at least one output pixel among the fewer output pixels for which bit shifting of one position was performed; and
correcting a value for each of the at least one output pixel by adding a lower bit of one of a pair of pixels used to create the at least one output pixel.

5. The image scaling system of claim 1 wherein:
the processor is configured to create the output image by iteratively calculating pixel values in first blocks of the output image by bit shifting and adding pixel values in second blocks of the input image.

6. The image scaling system of claim 1 wherein:
the first resolution of the input image is 600 dots per inch; and
the second resolution of the output image is 900 dots per inch.

7. The image scaling system of claim 1 wherein:
the first resolution of the input image is 600 dots per inch; and
the second resolution of the output image is 450 dots per inch.

8. The image scaling system of claim 1 further comprising:
a printer configured to receive the output image for printing on a print medium
wherein the processor is configured transmit the output image to the printer.

9. A method of scaling an input image, the method comprising:
receiving an instruction to scale an input image having a first resolution by a scaling ratio to create an output image having a second resolution;
determining a rational fraction approximation of the scaling ratio to obtain a numerator integer representing a first block of consecutive pixels in the output image and a denominator integer representing a second block of consecutive pixels in the input image;
calculating pixel values of the first block of pixels by:
bit shifting pixel values of the second block of pixels;
obtaining a sum of bit shifting operations of neighboring pixel values of the second block of pixels; and
correcting the sum with a correction value to compensate for rounding errors in the bit shifting; and
transmitting the output image.

10. The method of claim 9 wherein:
the correction value for a scaling ratio less than one is based on a count of a number of bits set to one in the second block of pixels.

11. The method of claim 9 further comprising:
if the scaling ratio is greater than one, converting multiple pixels representing color values in the input image into an increased number of output pixels in the output image by:
obtaining a first result by bit shifting a first value of a first pixel of the multiple pixels of the input image;
obtaining a second result by bit shifting a second value of a second pixel of the multiple pixels of the input image;
adding the first result and the second result to obtain a value of a output pixel; and
correcting the value of the output pixel by adding a lower bit of one of the first pixel and the second pixel to the value of the output pixel.

12. The method of claim 9 comprising:
if the scaling ratio is less than one, converting multiple pixels representing color values in the input image into fewer output pixels by:
performing a combination of bit shifting operations and summation operations on the multiple pixels in the input image to obtain values for the fewer output pixels;
identifying one or more output pixels among the fewer output pixels for which bit shifting of two positions was performed;
correcting a value for each of the one or more output pixels by adding a count of a number of bits set to one among two least significant bits in a color value among the multiple pixels used in converting to the one or more output pixels;
identifying at least one output pixel among the fewer output pixels for which bit shifting of one position was performed; and
correcting a value for each of the at least one output pixel by adding a lower bit of one of a pair of pixels used to create the at least one output pixel.

13. The method of claim 9 further comprising:
creating the output image by iteratively calculating pixel values in first blocks of the output image by bit shifting and adding pixel values in second blocks of the input image.

14. A non-transitory computer readable medium embodying programmed instructions which, when executed by a processor, are operable for performing a method of scaling an input image, the method comprising:
receiving an instruction to scale an input image having a first resolution by a scaling ratio to create an output image having a second resolution;
determining a rational fraction approximation of the scaling ratio to obtain a numerator integer representing a first block of consecutive pixels in the output image and a denominator integer representing a second block of consecutive pixels in the input image;
calculating pixel values of the first block of pixels by:
bit shifting pixel values of the second block of pixels;
obtaining a sum of the bit shifting operations of neighboring pixel values of the second block of pixels; and
correcting the sum with a correction value to compensate for rounding errors in the bit shifting; and
transmitting the output image.

15. The medium of claim 14, wherein:
the correction value for a scaling ratio less than one is based on a count of a number of bits set to one in the second block of pixels.

16. The medium of claim 14, the method further comprising:
if the scaling ratio is greater than one, converting multiple pixels representing color values in the input image into an increased number of output pixels in the output image by:
obtaining a first result by bit shifting a first value of a first pixel of the multiple pixels of the input image;
obtaining a second result by bit shifting a second value of a second pixel of the multiple pixels of the input image;
adding the first result and the second result to obtain a value of a output pixel; and
correcting the value of the output pixel by adding a lower bit of one of the first pixel and the second pixel to the value of the output pixel.

17. The medium of claim 14, the method further comprising:
if the scaling ratio is less than one, converting multiple pixels representing color values in the input image into fewer output pixels by:
performing a combination of bit shifting operations and summation operations on the multiple pixels in the input image to obtain values for the fewer output pixels;
identifying one or more output pixels among the fewer output pixels for which bit shifting of two positions was performed;
correcting a value for each of the one or more output pixels by adding a count of a number of bits set to one among two least significant bits in a color value among the multiple pixels used in converting to the one or more output pixels;
identifying at least one output pixel among the fewer output pixels for which bit shifting of one position was performed; and
correcting a value for each of the at least one output pixel by adding a lower bit of one of a pair of pixels used to create the at least one output pixel.

18. The medium of claim 14, the method further comprising:
creating the output image by iteratively calculating pixel values in first blocks of the output image by bit shifting and adding pixel values in second blocks of the input image.

19. The medium of claim 14, wherein:
the first resolution of the input image is 600 dots per inch; and
the second resolution of the output image is 900 dots per inch.

20. The medium of claim 14, wherein:
the first resolution of the input image is 600 dots per inch; and
the second resolution of the output image is 450 dots per inch.

\* \* \* \* \*